Jan. 9, 1951 G. A. LYON 2,537,072
WHEEL COVER
Filed Jan. 8, 1945
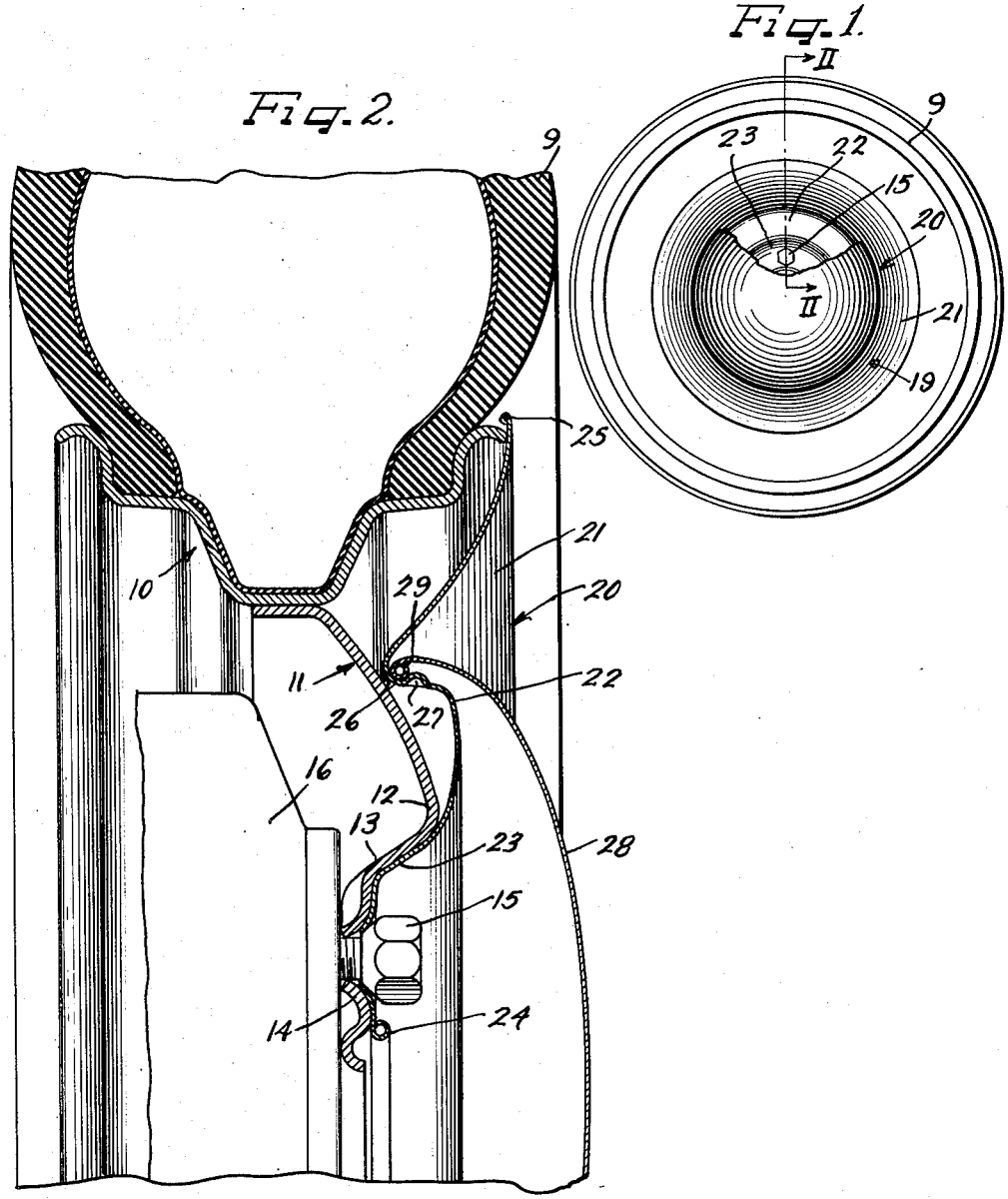
Inventor
GEORGE ALBERT LYON
The Firm of Charles W. Hills
by Attys.

Patented Jan. 9, 1951

2,537,072

UNITED STATES PATENT OFFICE 2,537,072

WHEEL COVER

George Albert Lyon, Allenhurst, N. J.

Application January 8, 1945, Serial No. 571,853

2 Claims. (Cl. 301—37)

This invention relates to a wheel structure and more particularly to a tensioned cover for an automobile wheel.

An object of this invention is to provide a metallic one-piece cover for detachably supporting a central hub cap and adapted to be held under tension on the body of the wheel by the usual cap screws or bolts employed in holding the wheel on an axle.

Another object of this invention relates to the provision of a cover carrying hub cap retaining means and being formed for bolt-on attachment to the central part of the wheel body.

Other objects and features of the invention will more fully appear from the following detailed description taken in connection with the accompanying drawings which illustrate a preferred embodiment thereof, and in which Figure 1 is a side view of a wheel showing my cover structure applied thereto and wherein the hub cap is partly broken away to illustrate the location of one of the wheel fastening elements; and Figure 2 is an enlarged fragmentary cross-sectional view taken on substantially line II—II of Figure 1 looking in the direction indicated by the arrows.

As shown on the drawings:

The reference character 9 designates generally an automobile pneumatic tire and tube supported in the usual way on a conventional multi-flange drop center tire rim 10. This tire rim part of the wheel is carried in the usual way upon a hollow metallic stamping which comprises the body part of the wheel and is designated generally by the reference character 11. The body part 11 has a bulged central nose 12, terminating in an inclined central portion 13, which in turn terminates in a generally radially extending bolt-on flange 14. This flange 14 is adapted to be attached in the usual way to a part on the wheel axle, such as the part 16, by a plurality of removable fastening elements. It is customary in the trade to employ either cap screws or bolts as fastening means and I have designated such fastening means by the reference character 15.

Cooperable with this wheel assembly is a wheel cover member designated generally by the reference character 20, and it may be made of any suitable material although excellent results may be obtained by making it of resilient sheet metal. This cover includes an outer annulus 21, a bulged inner portion 22 and an inclined central portion 23 conforming generally to the configuration of the inclined portion 13 in the bolt-on flange 14 of the wheel. This centrally dished portion 23 of the cover is apertured for alignment with the bolt holes of flange 14 so that the fastening elements 15 may be employed to attach both the cover and wheel to the part 16. It will be noted that the inner edge of the central dished portion 23 is rolled or curled at 24 to reinforce the same.

Also, the outer edge of the cover portion 21 is slightly turned or rolled at 25 to reinforce the cover and this turned edge 25 slightly overhangs the outer edge of the tire rim part 10 in close proximity to the tire.

The junction of the two portions 21 and 22 of the cover 20 is such as to provide an annular outwardly opening groove and is curved at 26 to define a hub cap seat. Also, the bulged portion 22 adjacent the portion 26 is provided with hub cap retaining means in the form of a plurality of spaced protuberances or retaining bumps 27 over which the rear turned springy edge 29 of the hub cap 28 is adapted to be sprung.

The portion 21 extends generally radially and axially inwardly from the outer edge 25 toward the body part 11 and is of channeled curved cross-sectional shape. In fact, the configuration of this portion 21, as well as its depth, is such as to cause this portion in use to appear to be a continuation of the curved side wall of the tire 9. This effect may be enhanced by giving the outer surface of portion 21 a white color in which event this portion will appear to constitute a white side wall part of the tire, in which the tire has the appearance of extending clear down to the hub cap of the wheel. Such an effect is very desirable as it causes the wheel to appear to have a much larger tire than is actually the case.

The cover portion 21, as shown in Figure 1, if it is so desired, may also be provided with a hole 19 for alignment with the usual valve stem and to afford access to the valve stem.

In the application of this cover 20 to the wheel, it is first placed over and axially aligned with the wheel. Upon being pressed against the wheel, it will contact the wheel at only a single point, namely at the outer edge of the cover; that is to say, the outer margin of the cover portion 21 will contact the outer edge of the rim part.

The holes in the dished portion 23 are aligned with the holes in the wheel bolt-on flange 14, and the fastening elements or screws 15 are thereafter threaded into the part 16. This results in the resilient stressing of the inner portion 23 of the cover toward the portion 13 of the wheel body part until the two portions 23 and 13 are brought into tight nested engagement. An advantage of this arrangement is that the cover is enabled to accommodate manufacturing variations in the wheel parts and is still capable of being brought into tight tensioned engagement with the wheel thereby preventing rattle of the cover on the wheel.

Thereafter the hub cap 28 is placed over the center of the cover and is pressed axially so that its springy continuous edge 29 is snapped over and behind the protuberances 27 into retained engagement with the cover 20. This results in the turned edge 29 of the hub cap being tightly seated on the curved junction portion 26 and also results in the portion 26 being slightly stressed toward the body part 11 of the wheel.

I claim as my invention:

1. In a wheel structure including a multi-flanged tire rim and a load sustaining body part having a central bolt-on flange and including attachment bolts by which the wheel is secured to a wheel axle part, a cover for substantially entirely covering the outer side of the wheel including an annular cover member comprising a radially outer portion of generally tire rim covering magnitude and extent and extending generally radially and axially inwardly to the body portion of the wheel and an inner annular portion humped in cross section and diverging generally axially outwardly from the juncture with said outer cover portion to define with said outer cover portion an annular outwardly opening juncture groove, said inner cover portion having a radially inner generally axially and radially inwardly extending marginal part secured by said bolts to said bolt-on flange for retaining the cover on the wheel, and a hub cap having a beaded edge engaging within said juncture groove, said inner cover portion having a series of radially outward cover retaining protrusions thereon adjacent to the bottom of said groove and retainingly engaged by said hub cap beaded edge.

2. In a cover for disposition at the outer side of a vehicle wheel which includes a tire rim and a wheel body part having a central bolt-on flange, an annular cover member and a hub cap cover member, said annular cover member comprising a radially inner and a radially outer portion, both of said portions being of axially outwardly humped convex cross section and joined together to provide an annular outwardly opening juncture groove, said inner portion having a generally radially outwardly facing shoulder at said juncture groove provided with a series of radially outwardly protruding retaining bumps, said hub cap having a beaded edge retainingly engaging behind said bumps within said groove and bottomed in said groove, the radially inner margin of said inner portion of the annular cover member including means for attachment to the wheel at the bolt-on flange thereof.

GEORGE ALBERT LYON.

REFERENCES CITED

The following references are of record in the file of this patent:

UNITED STATES PATENTS

| Number | Name | Date |
| --- | --- | --- |
| 2,166,216 | Lyon | July 18, 1939 |
| 2,298,669 | Wood | Oct. 13, 1942 |
| 2,368,232 | Aske | Jan. 30, 1945 |
| 2,432,530 | Lyon | Dec. 16, 1947 |